Feb. 11, 1930.                J. H. FAW                1,746,387
                     SOCKET WRENCH CONNECTION
                        Filed Dec. 27, 1926
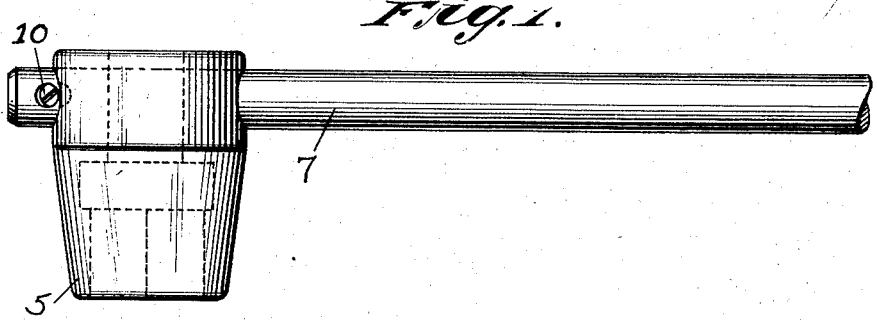
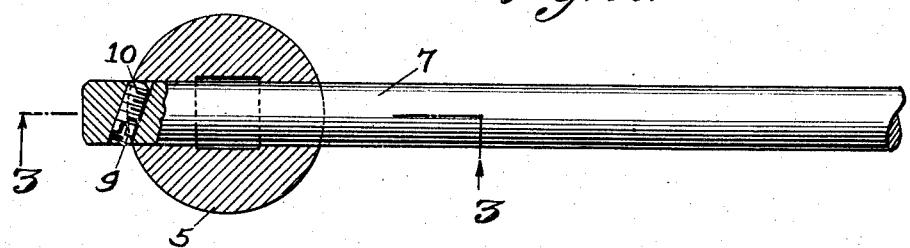
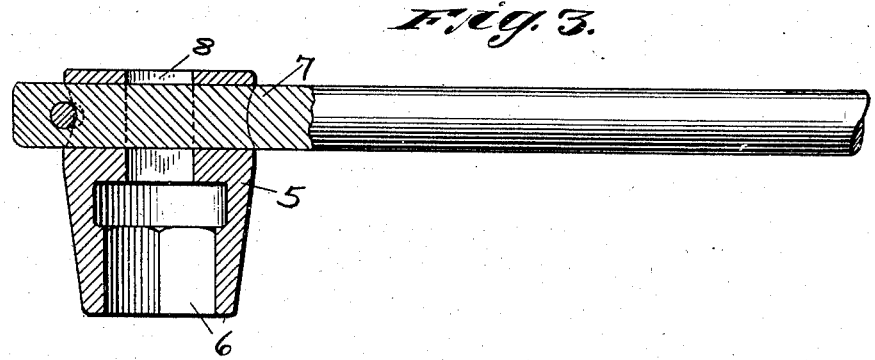

Patented Feb. 11, 1930

1,746,387

UNITED STATES PATENT OFFICE

JULIAN H. FAW, OF WHITE PLAINS, NEW YORK

SOCKET-WRENCH CONNECTION

Application filed December 27, 1926. Serial No. 157,031.

This invention relates to wrenches, and particularly to wrenches comprising a socket head which is removably secured to the shank of a handle or other operating device. This application is in the nature of a modification of the invention described in my copending application, Serial No. 150,449, filed November 24, 1926.

Wrenches of this type contemplate a number of sockets of different sizes, all adapted to fit the same handle shank. A firm and positive connection between socket and handle is essential, yet it is desirable that the means for securing the socket and handle together be so arranged that the socket can be quickly removed from the handle by simple manipulation. It is further desirable that the securing means comprise no parts such as screws, pins or wedges, which must be entirely withdrawn in order to remove the socket. Such small parts are liable to be misplaced and lost, thus interfering with a quick change of sockets and detracting substantially from the usefulness of the device. A wrench having a firmly secured socket and head which are quickly detachable without the removal of devices such as screws, and is rugged, durable and cheaply manufactured, is provided by the present invention, a typical embodiment of which is shown in the accompanying drawings, in which:

Fig. 1 is a side elevation of one form of wrench embodying the invention;

Fig. 2 is a plan view, partly in section; and

Fig. 3 is an elevation, partly in section, the section being substantially on the line 3—3 of Fig. 2.

The wrench head or socket 5 which comprises the usual nut receiving recess 6, is drilled transversely above the recess to receive the handle shank 7. A polygonal opening 8 may extend thru the socket in alignment with the recess 6, if desired, for receiving a polygonal shank extending in the direction of the axis of the socket. An opening 9 extends across the shank near its free end, the axis of said opening forming an angle with a line perpendicular to the axis of the shank, as clearly shown in Fig. 2. The opening 9 is tapped to receive the set screw 10. The inclination of the hole 9 is such that the point of the screw 10 bears against the periphery of the transverse socket opening which receives the shank 7 while the head of the screw is outside the socket and thus accessible for manipulation.

The screw 10 is of such length that its point may be withdrawn into the hole 9 while the head also is still within said hole. When this is done the shank may be withdrawn from the socket. The screw remains in the shank and is thus never lost or misplaced. By inserting the shank in and thru the socket to substantially the position shown in the drawings the screw head is made accessible and the screw point is in position to engage the periphery of the shank receiving opening. If the screw is now advanced a few turns into contact with the socket, the shank and socket will be firmly and rigidly secured together, and will so remain until the screw is again retracted. An effective but conveniently detachable connection is thus insured, which by a very slight movement of the screw 10 removes all obstruction to the separation of the shank and socket or firmly locks the two together.

It will be noted that the same socket which is used in the wrench connection of my application 150,449 is used in this invention and that the opening 8 and transverse bore are used in each connection.

Since the invention is readily susceptible of embodiment in other forms the embodiment thereof illustrated in the drawings and hereinbefore described in detail is to be considered as illustrative rather than restrictive, and the appended claims are to be construed as extending to all equivalent devices falling within a broad interpretation of their terms.

What I claim as my invention is:

1. In a device of the class described, a wrench head having a nut and handle receiving recess, and a transverse aperture, a handle to be received in said aperture at substantially right angles to the head, the handle having an internally threaded opening extending diagonally therethru and a threaded screw no longer than and approximately of the length of said opening to be received therein and turned into engagement at one end with the interior of the aperture at one side thereof adjacent one end of the latter, the other end of said screw being exposed thru said opening at the opposite side of said aperture to the exterior of the wrench head when said handle is inserted into the socket a sufficient distance to cause the screw to engage the side of the aperture.

2. In a device of the class described, a circular wrench head having a nut receiving recess, and provided with a transverse aperture, a handle to be engaged at one end with said aperture at substantially right angles to the head, the handle having a threaded opening extending diagonally therethru, and a threaded screw in said opening no longer than but approximately of the length of the opening, said screw when turned up binding against the interior surface of the aperture at one end to secure the handle to the head, and having its other end and the adjacent end of said opening exposed on the exterior of the wrench head.

In testimony whereof I have affixed my signature to this specification.

JULIAN H. FAW.